June 14, 1960  D. M. LAWRENCE  2,940,697
CONTROL SYSTEM
Filed May 2, 1955
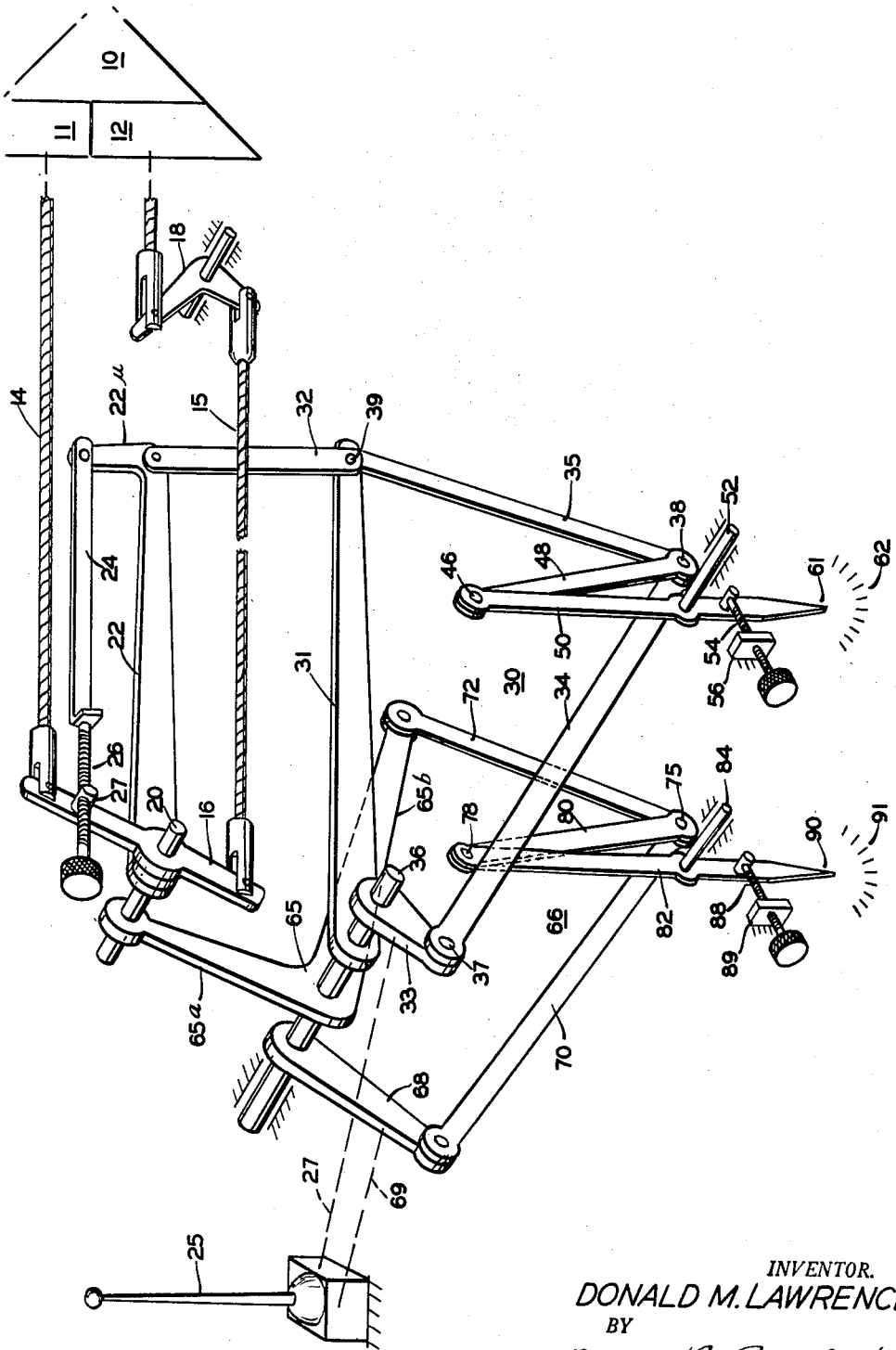
INVENTOR.
DONALD M. LAWRENCE
BY
Oscar B Brumback
ATTORNEY United States Patent Office 2,940,697
Patented June 14, 1960

2,940,697

CONTROL SYSTEM

Donald M. Lawrence, Wood-Ridge, N.J., assignor to Bendix Aviation Corporation, Teterboro, N.J., a corporation of Delaware Filed May 2, 1955, Ser. No. 505,336

5 Claims. (Cl. 244—83)

This invention relates generally to a steering system for aircraft and more particularly to improvements in the structure and arrangement described and claimed in the copending application Serial No. 504,284, filed April 27, 1955 by Walter D. Teague, Jr., and assigned to Bendix Aviation Corporation.

As the conventional manual control column of an aircraft having elevon surfaces is moved in a longitudinal or fore and aft direction, the elevon surfaces are moved in the same direction to control the pitch attitude of the craft; and as the control column is moved in a lateral direction the elevon surfaces are moved in opposite directions to control the roll attitude of the craft. The movements of these surfaces need be adjusted for parameter of flight because a given surface movement at high speeds or low altitudes will produce a greater aerodynamic response of the craft than at low speeds or high altitudes.

An object of the present invention, therefore, is to provide a novel steering system wherein the elevon surfaces of an aircraft are moved in the same direction in response to a pitch attitude maneuver command of the controller of the craft, are moved in opposite directions in response to a roll attitude maneuver command, and are moved in a direction corresponding to a composite of the ordered directions for simultaneous pitch and roll attitude maneuver commands.

Another object is to provide a novel steering system wherein provision is made for adjusting the ratio of movement of the controller to movement of the control surfaces so that more precise control of the craft may be obtained.

A further object is to provide a novel ratio changer whereby the movement of one element may be selectively varied with respect to the movement of a second element.

The present invention contemplates a control system for an aircraft having a controller movable in one direction for actuating the elevons of the craft to maneuver the craft about one of its axes and movable in another direction to maneuver the craft about another axis wherein novel provision is made so that a member may be moved relative to a support to actuate the elevons to control the craft about one axis while the support may be moved relative to the craft to actuate the elevons to control the craft about the other of its axes, the connection between the controller and the support and member including a device for changing the relation between the movement of the controller and the movement of the surface.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

The single sheet of drawing illustrates schematically the novel steering arrangement of the present invention as a system for controlling the elevon surfaces of an aircraft.

Turning now to the drawing, the aircraft 10 is provided with conventional elevon surfaces 11 and 12. When these surfaces are moved in different directions, they control the roll attitude of the craft; and when they are moved in the same direction, they control the pitch attitude of the craft.

Conventional links 14 and 15 connect surfaces 11 and 12 with a rotatable member 16; link 15 including a bell crank 18 which operates as a motion reversal. Thus, rotation of member 16 on shaft 20 will operate surfaces 11 and 12 in the same direction.

To provide for trimming the craft in pitch, an arm 22 is also journaled on shaft 20, and a member 24 pivotally attached to arm 22 acts as an abutment for a screw 26 threaded in a member 27 projecting from arm 16. The turning of screw 26 moves member 16 relative to arm 22 to trim the surfaces.

The fore and aft movements of manual controller 25 are transmitted to arm 16 through a suitable mechanical linkage 27, a ratio changing device 30 and an arm 31, link 32, arm 22, link 24 and screw 26.

Ratio changer 30 is comprised of six rigid members connected by six parallel pins. Members 31, 33, 34, and 35 are connected by pins 36, 37, 38, and 39 to form a polygon. The rotation of a link 34 about a shaft 36 by the fore and aft movements of controller 25 is transmitted by way of links 34 and 35 to the link 31. The position of link 32 relative to shaft 36 is fixed by arm 31, and the pivotal connection 38 for links 34 and 35 is constrained by member 48 to move about an axis 46.

The spatial position of axis 46 relative to the axis of shaft 36 determines the ratio of movement of member 33 relative to member 31. This position is controlled by the rotation of a member 50 on shaft 52 as a screw 54 is threaded in block 56. This positions the axis of pin 46 relative to the axis of shaft 36, the position of the axis being fixed for any given ratio. Thus, the ratio of the movement of controller 25 to the movement of surfaces 11 and 12 is set by turning screw 54 in block 56. This ratio is indicated by pointer 61 and indicia 62.

As the fore and aft movement of controller 25 displaces arm 33 angularly about shaft 36, the displacement moves link 34 to rotate pivot 38 about pivot 46 and moves link 35 to rotate arm 31 about shaft 36. Link 32 connected with member 31 rotates member 22 about shaft 20; and since the relative position of member 16 and portion 22u of member 22 is fixed by screw 26, the movement of controller 25 rotates member 16 about shaft 20 to raise or lower elevon surfaces 11 and 12 and change the pitch attitude of the craft.

Considering the operation of ratio changer 30, the change in ratio of controller to surface movement does not move elevon surfaces 11 and 12 when the controller is in a null position. At this time, the axis of pivot pin 38 and shaft 52 coincide. Since both members 48 and 50 then, in effect, are rotated about the same axis 38—52, the position of the axis of pin 38 does not change although the axis of pin 46 is executing an arc about shaft 52, as upon adjustment of the member 50.

For ease in explanation of the operation of the ratio changer, it will be assumed that members 33, 34, and 35 are of such length that the axis of pin 46 can coincide with either the axis of shaft 36 or the axis of pin 39. Accordingly, at one end of travel, the axis of pivot pin 46 and the axis of shaft 36 coincide. The ratio of movement of arm 33 to movement of arm 31 at this time will be substantially unity for both members 31 and 48, in effect, rotate about the same axis; member 35 constraining one member to rotate with the other. At the other end of the travel of pin 46, the axis of pins 46 and 39 will coincide. The ratio of movement of member 33 relative to the movement of arm 31 at this time will be infinite; in other words, movement of arm 33 about shaft 36 will result in no movement of arm 31 because members 48 and 35, in effect, rotate about the same axis and the position of pin 39 is unchanged. At any intermediate point between these extremes, the ratio of controller to control surface movement will be some finite value greater than unity, the value being indicated by index 61 and indicia 62. Members 31, 33, 34, 35, 48, and 50 obviously are not required to be of the dimensions assumed above to operate in accord with the principles discussed above.

To trim the craft in pitch, screw 26 is turned in projection 27, changing the position of member 16 relative to portion 22u of member 22 and rotating member 16 on shaft 20. This rotation of member 16 produces a differential movement on cables 14 and 15. However, due to bell crank 18, the differential movement is changed to movement in the same direction, and elevon surfaces 11 and 12 are displaced upwardly or downwardly to trim the craft in pitch.

To control the roll attitude of the craft, shaft 20 is rotated about shaft 36. To this end, shaft 20 is journaled in portion 65a of a bell crank 65. A portion 65b of bell crank 65 is connected by a ratio changing arrangement 66, similar to ratio changing arrangement 30, and a suitable mechanical linkage 69 to controller 25. The lateral movement of controller 25 rotates arm 68 about shaft 36 and by way of linkages 70 and 72 also rotates bell crank 65 about shaft 36. Link 80 constrains the pin 75 connecting linkages 70 and 72 to rotate about a pin 78 whose position with respect to shaft 36 is controlled by an arm 82 which pivots about shaft 84. The rotation of arm 82 about shaft 84 is controlled by a screw 88 threaded in a block 89, and the various ratios are indicated by pointer 90 and indicia 91. Thus, as the lateral movement of stick 25 rotates arm 68 about shaft 36, the rotation of pin 75 about axis 78 rotates bell crank 65 about shaft 36. This "pushes" or "pulls" cables 14 and 15 simultaneously; however, reversing mechanism 18 translates the "push" or "pull" into a differential action of surfaces 11 and 12. This action differentially displaces the surfaces to control the roll attitude of the craft.

Movement of controller 25 in a longitudinal or fore and aft direction moves both surfaces in the same direction, that is, raises and lowers surfaces 11 and 12 to control the pitch attitude of the craft. The extent of movement of the surfaces from a normal position with respect to a given movement of controller 25 from a null position is adjusted by turning screw 54. The normal position of the surfaces is controlled by turning screw 26 in block 27. At the same time, controller 25 may also be moved in a lateral direction to give a differential action to surfaces 11 and 12 to control the roll attitude. The relative movement of the surfaces with respect to a given lateral movement of stick 25 is controlled through ratio changer 66 by turning screw 88 in block 89. Thus, the actual movement of the surfaces for simultaneous longitudinal and lateral movement of controller 25 is a composite of the motions called for by the movements of the controller.

The foregoing has presented a novel steering system by which the elevon surfaces of an aircraft may be controlled differentially about a reference position which is also being moved relative to a normal position, thereby controlling the roll and pitch attitudes of the craft. The ratio of movement of the controller to movement of the surface may also be changed at the same time, and the pitch trim of the craft may be readily adjusted. It is also to be understood that the relationships of the linkages in the drawing have been exaggerated for purposes of clarity. In practice, the arrangement is made as nearly symmetrical as possible to reduce bending stresses.

Although only one embodiment of the invention has been illustrated and described in detail, it is to be expressly understood that invention is not limited thereto. Various changes can be made in the design and arrangement of the parts without departing from the spirit and scope of the invention as will now be understood by those skilled in the art.

What is claimed:

1. A control system for an aircraft having a controller adapted for moving a pair of control surfaces in the same direction and in different directions for maneuvering the craft about the pitch and roll axes, respectively, means responsive to movement of said controller in a longitudinal direction for moving said surfaces in the same direction, and means responsive to movement of said controller in a lateral direction for moving said surfaces in different directions, each of said means including a pair of input members journaled on a shaft, a pair of output members journaled on said shaft, and means for connecting a respective one of said input to one of said output members including a pair of members pivotally connected together by a common pivot and being connected to one of said input and output members, a third member connected to said common pivot and rotatable about a point, and means for moving said point to change the ratio of movement of input member to output member.

2. In an aircraft having control surfaces movable in the same direction or in different directions for maneuvering the craft about the pitch and roll axes, a movable controller, a shaft, a pair of input members journaled on said shaft, a pair of output members journaled on said shaft, means connecting a respective one of said input to one of said output members including a pair of members pivotally connected together at a common pivot and having an end connected to one of said input and output members, a third member connected to said common pivot and rotatable about a point, means for moving said point to change the ratio of movement of an input member to an output member, means for moving said input members in response to movement of said controller, a further member connected to said surfaces and journaled on one of said output members, and means connecting said member with said other output member whereby said surfaces may be moved in one sense by rotation of said further member and moved in another sense by rotation of said one output member.

3. A device for changing the ratio of movement of a controller to resulting movement of a control surface of an aircraft comprising four members pivotally connected to form the sides of a polygon, a support, one of said pivotal connections connecting said polygon to said support, means for rotating a first of the two adjacent members about said one pivot in response to said controller movement, the second of said two adjacent members rotating about said one pivot to provide said output for moving said surface, and means governing the ratio of rotation of said first member to said second member including the third and fourth of said remaining members, said third and fourth members being connected at a pivot diagonally opposed to said one pivot, a fifth member connected to said opposed pivot and rotatable about a point, and means for positioning said point relative to said one pivot, whereby rotation of said one member about said one pivot in response to movement of said controller rotates said opposed pivot about said point to rotate said second member to provide a ratio of controller movement to surface movement variable as a function of the position of said point relative to said one pivot.

4. A device for changing the ratio of movement of a controller to resulting movement of a control surface of a craft comprising four members, four pivots connecting said members to form a polygon, a support, one of said pivots connecting two adjacent members of said polygon to said support, means connecting a first of said two members to said controller for the rotation of said member about said pivot, means connecting the second of said two members to said first member including the remaining two members, a further member connected to the pivot diagonally opposed to said one pivot, said further member being rotatable about a point, means for positioning said point relative to said one pivot whereby rotation of said first member about said one pivot by said controller rotates said opposed pivot about said point to rotate said second member at a ratio of input movement to output movement varying as a function of the position of said point relative to said one pivot, and means connecting said second member to said surface.

5. A control system for an aircraft in which the movement of a controller causes movement of a control surface, comprising four members, four parallel pins connecting said members in a linkage in the form of a polygon, whereby said individual members move in several parallel planes, one of said pins being fixed, means for rotating a first one of the pair of said members which are pivoted to said fixed pin about the latter in proportion to movement to said controller, whereby the rotation of said first member is transmitted to the second of said pair of members by the remaining pair of members, means for controlling the ratio of movement of said first member to said second member including a further member connected to the common one of said pins which connects said pair of remaining members, means for pivoting said further member about a further parallel pin, and means for adjusting the position of said further pin relative to said fixed pin to vary the ratio of movement of said first member to said second member, and means for moving said surface in proportion to the rotation of said second member.

References Cited in the file of this patent

UNITED STATES PATENTS

| | | |
|---|---|---|
| 2,573,044 | Morris | Oct. 30, 1951 |
| 2,596,242 | Hill | May 13, 1952 |
| 2,660,383 | Feeney et al. | Nov. 24, 1953 |
| 2,680,581 | McKellar | June 8, 1954 |

FOREIGN PATENTS

| | | |
|---|---|---|
| 852,599 | France | Oct. 30, 1939 |